United States Patent
Gharote et al.

(10) Patent No.: US 10,242,577 B2
(45) Date of Patent: Mar. 26, 2019

(54) DATA COMMUNICATION BETWEEN AIRPORT SURVEILLANCE RADAR AND ONBOARD AIRBORNE WEATHER RADAR

(71) Applicant: Honeywell International Inc., Morris Plains, NJ (US)

(72) Inventors: Yogesh Prabhakar Gharote, Bangalore (IN); Venkatesh Ramachandra, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/366,603

(22) Filed: Dec. 1, 2016

(65) Prior Publication Data
US 2018/0158342 A1    Jun. 7, 2018

(51) Int. Cl.
*G08G 5/00* (2006.01)
*G01S 7/00* (2006.01)
(Continued)

(52) U.S. Cl.
CPC ............ *G08G 5/0013* (2013.01); *G01S 7/003* (2013.01); *G01S 13/913* (2013.01); *G01S 13/953* (2013.01); *G08G 5/0026* (2013.01); *G08G 5/0082* (2013.01); *G08G 5/0086* (2013.01); *G08G 5/0091* (2013.01); *G08G 5/0065* (2013.01); *G08G 5/025* (2013.01); *Y02A 90/18* (2018.01)

(58) Field of Classification Search
CPC .. G08G 5/0013; G08G 5/0091; G08G 5/0026; G08G 5/0082; G08G 5/0086; G08G 5/025; G08G 5/006; G01S 13/913; G01S 7/003; G01S 13/953; Y02A 90/18
See application file for complete search history.

(56) References Cited

U.S. PATENT DOCUMENTS 5,657,009 A     8/1997   Gordon
5,717,410 A  *  2/1998   Ohmine ................. H01Q 13/10
                                                        343/767
(Continued)

OTHER PUBLICATIONS

Gilissen, "How does the predictive windshear system (PWS) work in an aircraft?" Quora, retrieved from https://www.quora.com/How-does-the-predictive-windshear-system-PWS-work-in-an-aircraft on Aug. 22, 2016, written Aug. 19, 2015, 4 pp.
(Continued)

*Primary Examiner* — Ryan W Sherwin
(74) *Attorney, Agent, or Firm* — Shumaker & Sieffert, P.A.

(57) ABSTRACT

This disclosure is directed to weather radar configured to act as a communication device to allow real time data communication. This disclosure describes using weather radar on board aircraft as a high bandwidth X-band radio for communication. The X-band weather radar is used for receiving flight related data and weather-related data while still acting as a weather radar. As the weather radar system is already present on most commercial aircraft, there is no requirement for additional hardware, devices or equipment onboard the aircraft to meet the data communication needs. An airport may install an X-band data transmitter to broadcast digital data received from detection systems at or near an airport such as an Automated Weather Observing System (AWOS), predictive wind shear (PWS) and bird strike warning systems.

20 Claims, 5 Drawing Sheets

(51) Int. Cl.
  *G01S 13/91* (2006.01)
  *G01S 13/95* (2006.01)
  *G08G 5/02* (2006.01)

(56) References Cited

U.S. PATENT DOCUMENTS

| | | |
|---|---|---|
| 6,441,773 B1 | 8/2002 | Kelly et al. |
| 7,898,463 B1 | 3/2011 | Mueller et al. |
| 8,344,933 B1 | 1/2013 | Kronfeld et al. |
| 8,456,349 B1 | 6/2013 | Piesinger |
| 9,223,020 B1 * | 12/2015 | Crosmer ............... G01S 13/951 |
| 2012/0133283 A1 * | 5/2012 | Everett ............. H05B 37/0227 |
| | | 315/77 |
| 2015/0236409 A1 | 8/2015 | Stayton |
| 2016/0131739 A1 * | 5/2016 | Jinkins ................. G01S 13/953 |
| | | 342/26 B |
| 2016/0282131 A1 * | 9/2016 | Palfreyman ......... G01S 13/9303 |

OTHER PUBLICATIONS

Higdon, "A Buyer's Guide: Multi-Function Displays MFDs: The World on a Screen," Pilot's Guide to Avionics, 2008-2009 edition, retrieved from http://www.aeapilotsguide.net/pdf/08-09_Archive/PG08BuyersGuideToMulti-FunctionDisplays.pdf on Nov. 15, 2016, 6 pp.

Extended Search Report from counterpart European Application No. 17202467.1, dated May 4, 2018, 12 pp.

Response to Extended Search Report for Application EP 17 202 467.1 dated Jun. 11, 2018, filed Oct. 26, 2018, 14 pp.

\* cited by examiner

DATA COMMUNICATION BETWEEN AIRPORT SURVEILLANCE RADAR AND ONBOARD AIRBORNE WEATHER RADAR

TECHNICAL FIELD

The disclosure relates to data communications using X-band radar systems.

BACKGROUND

An airport shares real time information with arriving and departing aircraft over many communication channels. Voice communication is widely used to communicate weather information such as visibility, wind speed and direction, precipitation, and atmospheric pressure, used to set an aircraft's altimeter. Weather information may be recorded or automated and repeatedly broadcasted on the automatic terminal information service (ATIS). An airport may have a voice radio channel dedicated to the ATIS for that airport. An airport also uses voice communication to tell a departing aircraft which taxiway and runway to use while on the ground and may also communicate potential hazards in the area, such as ground vehicles or animals. Air traffic control may use voice communication for aircraft approaching for landing to direct aircraft movements into a landing pattern, instruct which instrument approach to use, instruct which runways to use, and for providing other such directions. With voice communications, only one person may speak at a time for a given channel, resulting in limited bandwidth, especially at busy airports or during emergencies.

Other real-time communication channels include high speed communication links such as broadband and satellite. Although efficient, current communication links suffer from challenges such as limited coverage area, periodic unavailability of communication link, and increasing demand for bandwidth in today's aircraft. Factors important in communication links include data speed, cost, and reliability of the communication link. In some examples, flight data may be shared between aircraft using ground systems because of the high bandwidth requirements.

SUMMARY

In general, this disclosure is directed to weather radar configured to act as a communication device to allow real time data communication. This disclosure describes techniques for using weather radar on board aircraft as a high bandwidth X-band radio for communication. According to the techniques of this disclosure, the X-band weather radar onboard an aircraft may be configured to receive flight related data and weather-related data while also acting as a weather radar. As the weather radar is already present on many aircraft, the techniques of this disclosure may, in some implementation, be implemented without a need for additional hardware, devices, or equipment onboard the aircraft to meet the data communication needs. An airport may utilize an X-band data transmitter to broadcast digital data to aircraft in the vicinity of the airport.

In one example, the disclosure is directed to a method in comprising: receiving, by a weather radar system of an aircraft, an X-band carrier signal comprising a data stream, converting, by the weather radar system, the data stream into an alert signal, and outputting, by the weather radar system, a representation of the alert signal.

In another example, the disclosure is directed to a system for data communication, the system comprising: a data communication interface, wherein the data communication interface retrieves first information from a first airport detection system. The system further comprises an X-band data conversion unit, wherein the X-band data conversion unit is communicatively coupled to the data communication interface and converts the first information from the first airport detection system to first X-band data, an X-band data transmitter; and an omnidirectional antenna, wherein the X-band data transmitter receives the first X-band data from the X-band data converter and transmits the first X-band data to the omnidirectional antenna.

In another example, the disclosure is directed to a device installed in an aircraft comprising: an X-band receiving antenna, wherein the X-band receiving antenna receives an X-band data signal, X-band data receiver circuitry, wherein the X-band data receiver circuitry extracts a data stream from the X-band data signal and converts the data stream into an alert signal, an output, wherein the device outputs a representation of the alert signal at the output.

The details of one or more examples of the disclosure are set forth in the accompanying drawings and the description below. Other features, objects, and advantages of the disclosure will be apparent from the description and drawings, and from the claims.

DETAILED DESCRIPTION

This disclosure is directed to weather radar configured to act as a communication device to allow real-time data communication. This disclosure describes techniques for using a weather radar on board an aircraft as a high bandwidth X-band radio for communication. The X-band weather radar, onboard an aircraft, may be used for receiving flight related data and weather-related data while also acting as a weather radar. As the weather radar is already present on many aircraft, particularly commercial aircraft, the techniques of this disclosure may, in some scenarios, be implemented without a need for additional hardware, devices, or equipment onboard the aircraft to meet the data communication needs According to the techniques of this disclosure, an airport may utilize an X-band data transmitter to broadcast digital data to aircraft in the vicinity of the airport. The X-band data transmitter and the weather radar systems of airplanes at the airport may engage in a one-to-many communication session, such that multiple weather radar systems on multiple planes receive the digital data being broadcast by the airport. The X-band data transmitter may receive the digital data from a data conversion interface unit that collects information from other systems at or near an airport. Some of these systems may include systems that collect weather information such as an Automated Weather Observing System (AWOS), lightning detector, and predictive wind shear system (PWS). The weather-related systems may provide digitized information on wind speed and direction, air pressure, wind shear hazard areas, precipitation, and similar information.

Other systems on or near an airport may provide situational awareness information of interest to the X-band data transmitter, which in turn may relay such information to arriving or departing aircraft. This information may include the location of possible hazards on the ground or in the air such as animals or birds near the airport, the location of other aircraft taxiing to and from the airport runways, and the location of ground vehicles. The data conversion interface may receive information from these other systems and broadcast this information in a data stream included in a signal transmitted by the X-band data transmitter. Existing X-band weather radar systems onboard aircraft in the vicinity of the airport may act as an X-band radio to receive the data stream containing the information from these airport systems. A pilot on the aircraft may choose to display any or all of the information from the data stream. For example, a pilot may choose to display the PWS and avian hazard areas, but rely on the aircraft's own lightning detection system to display lightning location.

Other channels such as voice communication, satellite communication links, cellular data links, or similar communication channels are currently used for transmitting these types of information. Shifting information flow to X-band weather radar systems acting as an X-band radio may reduce the bandwidth needs of other channels such as voice communication or satellite links. For example, if an incoming aircraft pilot can receive and display the location of potential wind shear hazards via the X-band radio channel, then the airport control tower may be able to avoid using limited voice channel airtime to describe the wind shear locations. This may allow the voice communication channel, along with other data link channels, to have more bandwidth available for other functions.

The use of weather radars on aircraft as a data communication device, i.e. an X-band radio, has several other possible advantages. The additional X-band radio channel may augment the data transfer requirements of other communication links. An X-band radio has the capability to transmit at high data rates. The design of data communication mode in the weather radar is configured to allow maximum bandwidth usage to transmit data at high rates while still allowing full use of the weather radar to detect and display weather information. The large beam width of the weather radar allows wide coverage area at longer distances. The weather radar is available for operation as soon as the aircraft powers on the radar during preparation for takeoff and is available for data communication needs. Converting an existing weather radar system to add an X-band radio function requires no additional hardware or equipment for the aircraft. A modification in firmware/software of the weather radar may alone be sufficient for using the weather radar as a communication device.

In contrast, some complex communication systems may use other types of data links to transfer data to and from an aircraft. These types of complex communication systems may include scheduling units to date and time stamp data, unlike the less complex X-band radio channel. These complex communication systems may allow data fusion to combine information from ground stations or other aircraft to be fused into a single display. These complex communication systems may have advantages in providing information to an aircraft, such as aircraft 32, that may be outside the range of weather radar system 40B onboard aircraft 32. However, these complex communication systems have a disadvantage in requiring installation of complex hardware that may include scheduling units to time stamp and manage data flow for data fusion. Complex communication systems, such as those in use or proposed at present, would need to be installed in new aircraft and back fitted into older aircraft, which may be a significant cost to aircraft operators. Also, these complex systems may consume additional bandwidth by transmitting detailed weather and other information over data links that may be expensive and already filled close to capacity. Pushing additional data on a crowded bandwidth may require more bandwidth sharing and therefore the situational awareness information may be slow to download. An X-band radio channel using existing weather radar may offer some advantages over a more complex communication system in some situations.

Figure 1:
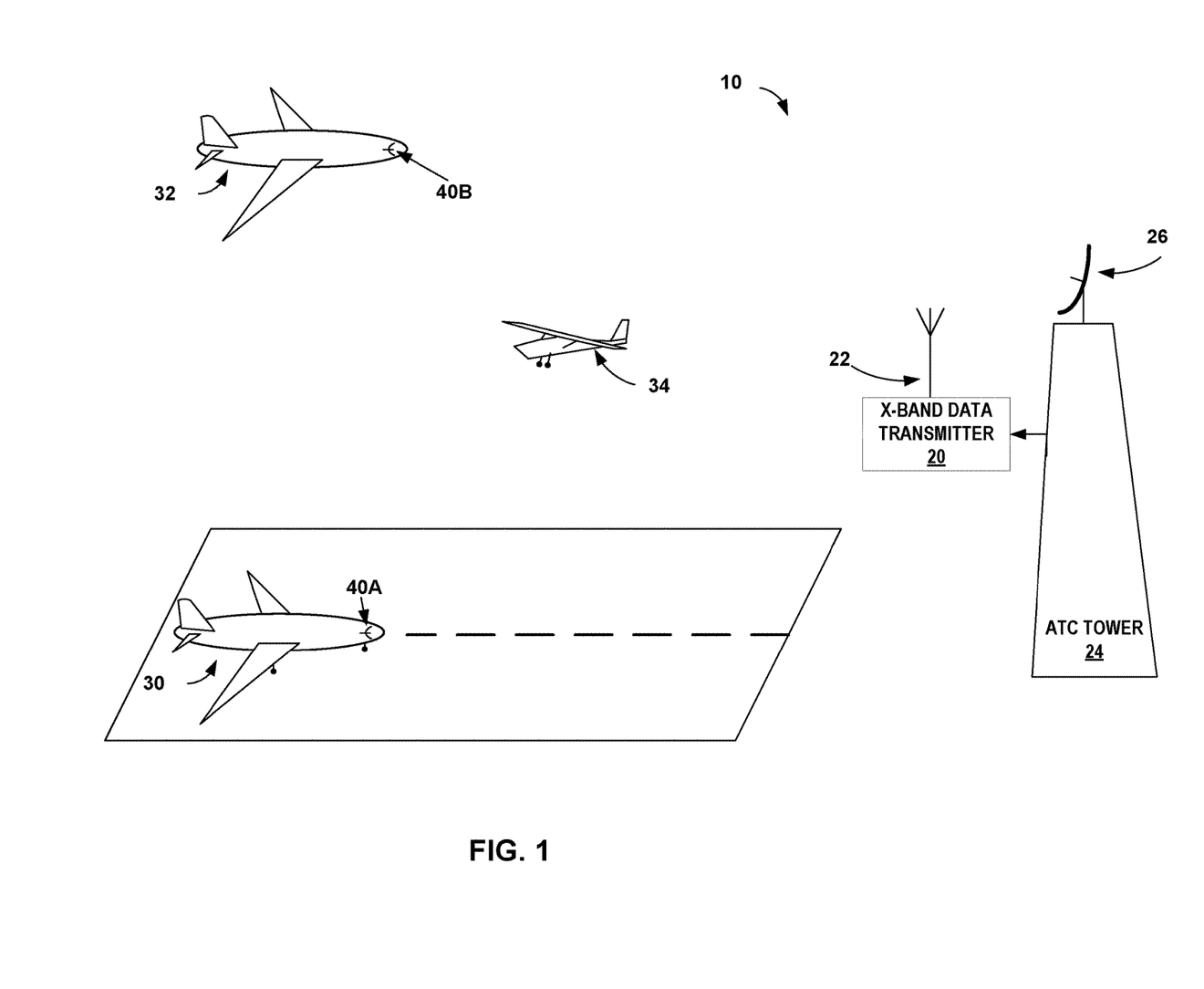
FIG. 1 is a conceptual diagram illustrating an example airport that includes an X-band data transmitter in accordance with one or more techniques of this disclosure.

FIG. 1 is a conceptual diagram illustrating an example airport that includes an X-band data transmitter in accordance with one or more techniques of this disclosure. FIG. 1 also depicts examples of aircraft that include weather radar systems modified to receive X-band radio data while operating on or near an airport.

Airport 10 of FIG. 1 may include an X-band data transmitter 20 with an omnidirectional antenna 22. X-band data transmitter 20 connects to the various systems that provide situational awareness information to pilots, as depicted by the connection to air traffic control (ATC) tower 24. Aircraft 30, with weather radar system 40A is conducting ground operations, such as taxi to or from a runway. Aircraft 32 with weather radar system 40B may be approaching or departing airport 10. Aircraft 34 is an aircraft without a weather radar system, such as a smaller general aviation aircraft.

The example of FIG. 1 depicts X-band data transmitter 20 connected to ATC tower 24. A data conversion interface within, or coupled to, X-band data transmitter 20 may receive and convert aircraft position information received from ATC radar 26, as well as information from other systems located on or near airport 10. In some examples, ATC radar 26 may be called airport surveillance radar (ASR). X-band data transmitter 20 may be installed in ATC tower 24, as shown in the example of FIG. 1. In other examples, X-band data transmitter 20 may be installed anywhere near airport 10 that allows adequate coverage of the data stream broadcast through omnidirectional antenna 22. For example, X-band data transmitter 20 and omnidirectional antenna 22 may be installed on a hill near airport 10 to prevent blocking or masking the data stream signal by the hill.

Aircraft 30, conducting ground operations, may receive information through weather radar system 40A that is acting as an X-band radio receiver. In some examples aircraft 30 may operate weather radar system 40A with the weather radar functions turned off while on the ground. In these examples, weather radar system 40A may act as an X-band radio receiver without simultaneously operating as a weather radar. The pilot of aircraft 30 may choose to display information to assist ground situational awareness. For example, the pilot of aircraft 30 may display the location of ground vehicles or other aircraft on the ground, which may come from an airport surface detection system, such as ground control radar. If departing, aircraft 30 may also display weather information. This may include the air pressure, to set the aircraft altimeter, wind speed and direction, visibility, and other weather-related information.

Aircraft 32 may be arriving, departing or just flying near airport 10. In the example of aircraft 32 making an approach to airport 10, the pilot of aircraft 32 may choose to display airport weather information received by weather radar system 40B operating as an X-band radio receiver. The pilot of aircraft 32 may choose to display the location of potential wind shear or bird strike hazards received in the data stream through X-band radio. In some examples, aircraft 32 may not include a PWS or avian radar system such as may be installed at airport 10. In the example above, aircraft 30 and aircraft 32 may receive the same signal, and thus be able to display the same information, potentially subject to pilot preference.

Aircraft 34 may not include a weather radar. Smaller aircraft, such as some general aviation aircraft or light sport aircraft may not include weather radar systems. Aircraft without a weather radar system, such as aircraft 34, may still take advantage of the additional situational awareness provided by the techniques of this disclosure. For example, by installing a simple X-band radio receiver unit on aircraft 34, aircraft 34 may be able to receive information received by aircraft 30 and aircraft 32. The X-band radio receiver unit may include an omnidirectional X-band receiving antenna and circuitry for down converting and decoding the X-band data signal sent by X-band data transmitter 20. The X-band radio receiver circuitry in this example may extract the data stream from the signal broadcast by X-band data transmitter 20. In some examples, the X-band radio receiver unit may include a display output that may connect to an existing display unit within aircraft 34, such as a multi-function display (MFD) unit or a portable display such as a tablet computer. In other examples, the X-band radio receiver unit may include an integrated display unit. The X-band radio receiver circuitry may convert the data stream into an alert signal that may cause a display unit to present a representation of the alert signal. This representation may include information from the data stream for presentation to the pilot of aircraft 34. Either the MFD, tablet computer or integrated display may allow the pilot of aircraft 34 to select and display information decoded from the data stream broadcast by X-band data transmitter 20. In some examples, the alert signal may be converted into an auditory message that may be played to the pilot. For example, an auditory message may be presented to the pilot that says, "warning, wind shear area within 1.5 NM of current position."

Aircraft operating on or near an airport may include large commercial aircraft to small light sport aircraft. Aircraft have a wide variety of systems available to provide pilots situational awareness. Large commercial aircraft may have sophisticated weather radar, lightning detection and other systems. However, even large aircraft may not include avian detection or PWS systems. Currently, aircraft may receive additional information to aid in situational awareness via data links from satellite, cellular networks, and similar data links.

For many existing aircraft, adding an X-band radio capability to an existing weather radar system according to the techniques of this disclosure may require no data fusion or additional hardware or equipment on the aircraft. Instead, in some implementations, an aircraft may be configured to perform the techniques of this disclosure through an update to the firmware and/or software of the existing weather radar onboard the aircraft. The software and/or firmware update may add, to the existing weather radar of the aircraft, the functionality of using the weather radar as an X-band communication device.

An airport using the techniques of this disclosure may need to install some additional hardware. An airport, for example, may need to add an X-band data transmitter unit, such as X-band data transmitter 20, along with omnidirectional antenna 22 to broadcast the X-band data stream. The X-band data transmitter unit may receive information from other airport systems that may not be available onboard an aircraft. An X-band data transmitter, as described by this disclosure, may reduce the bandwidth load on other communication channels, such as the complex communication channels above, voice communication and satellite data links. An X-band communication system according to the techniques of this disclosure may provide information such as weather information from AWOS, lightning information and position information of other aircraft. This may free these other channels, such as the complex data fusion channel above, to provide faster data transfer for information either not available from airport detection systems, or more suitable for data fusion, such as raw weather radar data.

Aircraft, such as aircraft 30-34 may receive position information via other systems such as automatic dependent surveillance-broadcast (ADS-B). However, ADS-B may not be installed on everything that may be a potential hazard to an aircraft either approaching an airport or during ground operations. For example, ground vehicles or animals, such as deer, wild pigs or loose livestock will not be shown by ADS-B. Other airport systems, such as ground surveillance systems, avian detection systems etc. may detect the presence and location of these other hazards. An X-band data transmitter, according to the techniques of this disclosure, may provide additional situational awareness to pilots through a high speed X-band data channel.

Figure 2:
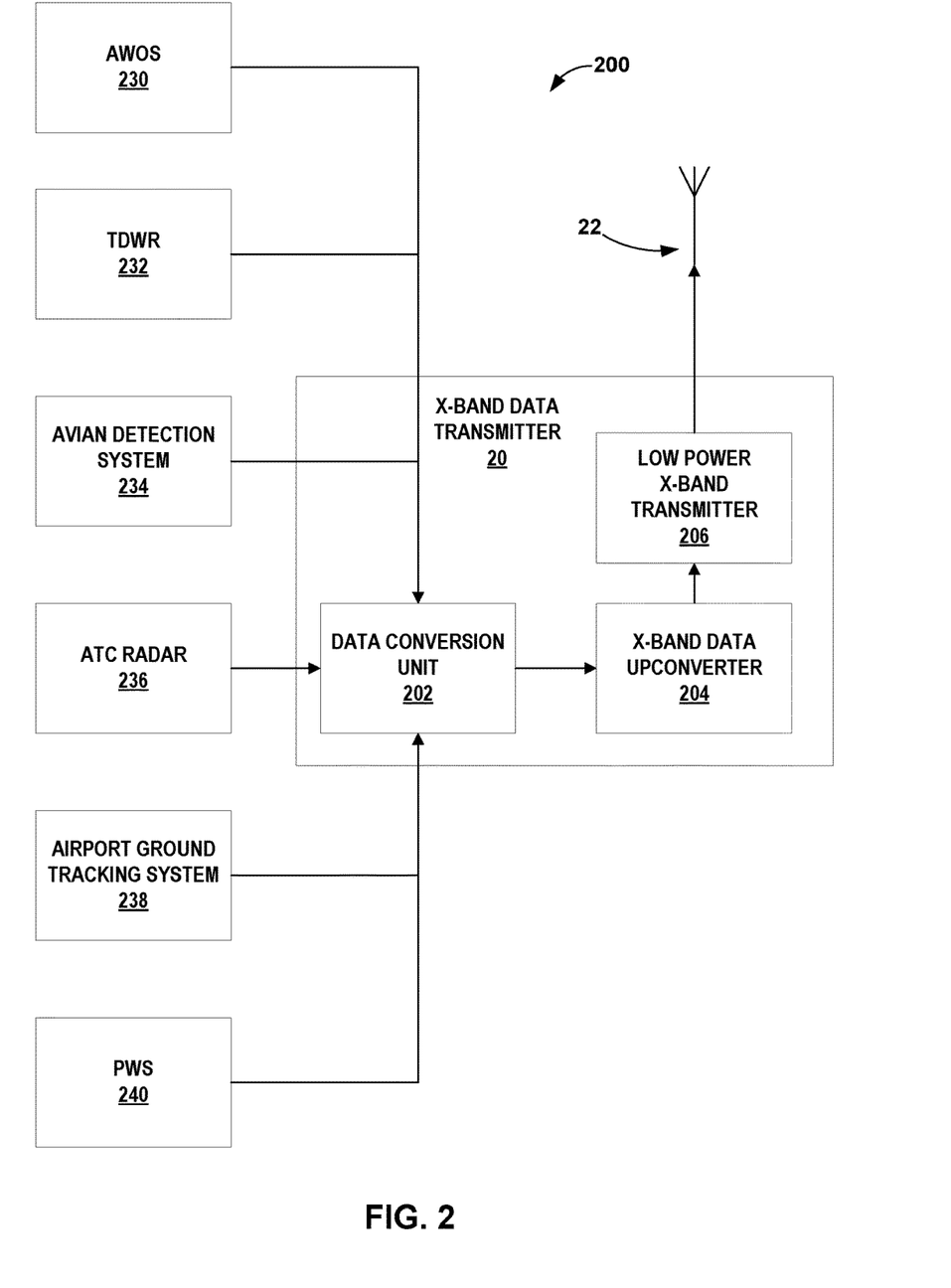
FIG. 2 is a block diagram illustrating an example system to broadcast information to aircraft using an X-band data transmitter in accordance with one or more techniques of this disclosure.

FIG. 2 is a block diagram illustrating an example system to broadcast information to aircraft using an X-band data transmitter in accordance with one or more techniques of this disclosure. Other example systems may include more, fewer, or different components than shown in the example of FIG. 2.

System 200 may broadcast information to aircraft on or near an airport from various airport detection systems. System 200 may include information from one or more airport detection systems, convert the information into a data stream and communicate to aircraft in the vicinity of the airport by broadcasting the data stream over an X-band radio. The aircraft may receive the X-band radio data stream using an X-band weather radar that is functioning as an X-band radio receiver and as a weather radar.

System 200 may include an X-band data transmitter 20 connected to omnidirectional antenna 22. X-band data transmitter 20 and omnidirectional antenna 22 perform the same functions as X-band data transmitter 20 and omnidirectional antenna 22 shown in FIG. 1. X-band data transmitter 20 may retrieve information from various airport detection systems. The airport detection systems shown in FIG. 2 include an AWOS 230, terminal Doppler weather radar (TDWR) 232, avian detection system 234, ATC radar 236, airport ground tracking system 238 and PWS 240. Example system 200 may include more, fewer or different airport detection systems than those depicted by FIG. 2. In some examples, system 200 may include lightning detection, ADS-B, or other detection systems not shown in FIG. 2.

X-band data transmitter 20 may include data conversion unit 202, X-band data upconverter 204 and low power X-band transmitter 206. The components of X-band data transmitter 20 retrieve information from the various airport detection systems and convert the information into a data stream that is compatible with the data decoding firmware/software in the weather radar onboard an aircraft, such as weather radar systems 40A and 40B described in FIG. 1 above. X-band data transmitter 20 may receive the information from the various airport detection systems via a variety of means. Some airport detection systems may connect to X-band data transmitter 20 via a data communication interface. A data communication interface may include Ethernet, optical cable, wireless communication or similar interface used to transfer data.

Example X-band data transmitter 20 shown in FIG. 2 is one possible implementation. In some examples data conversion unit 202 and X-band data upconverter 204 may be combined in a single block that is communicatively coupled to the data communication interface. In the example where data conversion unit 202 and X-band data upconverter 204 are a single block, the input to this block may be information from one or more airport detection systems, such as TDWR 232. The output may be X-band data, where X-band data is an X-band carrier signal modulated with the data stream that includes information from one or more airport detection systems. Other examples of X-band data transmitter 20 may include different arrangements of functional blocks.

Data conversion unit 202 may receive information from the one or more airport detection systems through the data communication interface. Each airport detection system may output its data in a format particular to the detection system. For example, TDWR 232 and PWS 240 may output the location of weather features in their own particular data format. As another example, different manufacturers of PWS systems, such as PWS 240 may choose somewhat different formats to output predicted wind shear area locations. Data conversion unit 202 receives data from the airport detection system in the format as sent by the airport detection system. In one example, data conversion unit 202, may convert the coordinates given by the airport radar systems (232, 234, 236, 238, 240) into pre-processed coordinates which can be manipulated by the receiving weather radars for correct positional display of the artifacts of different weather or other hazards on the respective aircraft displays. The respective aircraft displays may include an MFD or other display as well as an auditory message as described above. Data conversion unit 202 may be responsible for converting a wide variety of data related to weather, lightening, wind shear, bird flocks, animals and ground obstacles into suitable global coordinates which can be finally displayed on the respective aircraft display after the weather radar receives the data.

X-band data upconverter 204 receives the data stream from data conversion unit 202. X-band data upconverter 204 modulates an X-band carrier signal to load the data stream into the X-band carrier signal. In some examples, X-band data upconverter 204 may modulate a baseband carrier signal, then up-convert the baseband carrier through one or more stages of carrier multiplication and associated filtering until the modulated carrier signal reaches X-band frequency. The modulated carrier signal containing the data stream may be considered X-band data. X-band data upconverter 204 sends the modulated carrier signal to low power X-band transmitter 206.

Low power X-band transmitter 206 filters and amplifies the X-band data and transmits the amplified X-band data to omnidirectional antenna 22. In other words, low power X-band transmitter 206 amplifies the X-band carrier signal, which includes the modulated data stream containing information from the airport detection systems. Low power X-band transmitter 206 is configured to broadcast the X-band data with power low enough so that it is enough to cover the vicinity of the airport and does not reduce the sensitivity of the radars operating nearby. For this disclosure, the "vicinity" of an airport may be considered approximately ten nautical miles. The precise distance may vary depending on line-of-sight, interference from structures and land masses such as mountains, as well as atmospheric conditions and other factors.

AWOS 230 collects weather information on or near an airport. AWOS 230 is a type of automated airport weather station. Other types of automated airport weather stations include automated surface observing system (ASOS) and automated weather sensor system (AWSS). These automated sensor suites provide meteorological observations for aviation and other operations, including weather forecasting. AWOS 230 may provide information such as visibility, cloud cover and ceiling, temperature, humidity, barometric air pressure and runway wind direction and speed, precipitation, similar measurements. In some examples AWOS 230 includes lightning detection. AWOS 230 may output weather information through the data communication interface to data conversion unit 202.

TDWR 232 is a network of terminal Doppler weather radar systems. These Doppler radar systems are used primarily for the detection of hazardous wind shear conditions, precipitation, and winds aloft on and near major airports. Many TDWR systems may be located in regions that have climates with thunderstorms. TDWR 232 may output weather information in data blocks that may include header and data sections. In some examples the data sections are compressed and may need decompression software tools to decompress and decode. One example format may include the Network Common Data Format (NetCDF), which is a set of data formats that support the sharing of scientific data.

Avian detection system 234 detect avian targets over airport operating areas and in some examples outside the fence to protect against bird strikes that may damage aircraft and injure birds. Some examples of avian detection system 234 include radar, cameras and processing software for detection, location, tracking and target classification of birds. Examples of radar may include S-band rotating radars and non-rotating electronically steered radars. In some examples the processing software in avian detection system 234 may combine infrared and electro-optical cameras with radar detection to confirm the location and movements of birds near an airport. A bird strike prevention system may include an avian detection system that also has the capability to cause birds to move away from the airport. Avian detection system 234 may output bird location information such as bird flock location coordinates through the data communication interface to data conversion unit 202.

ATC radar 236 detects and tracks the location of aircraft for air traffic controllers to provide air traffic separation for collision avoidance and efficient movement of aircraft. In addition to the radar return from aircraft, ATC radar 236 may receive transponder replies that include aircraft identification, altitude and other information. Examples of ATC radar 236 include radars for local airport traffic and radars that track aircraft transiting the airspace between airports. ATC radar 236 may output airborne aircraft location coordinates, altitude, direction, speed or other information to the data communication interface. Data conversion unit 202 may convert some or all of this information to be broadcast by X-band data transmitter 20.

Airport ground tracking system 238 may include visual observation from an airport control tower as well as surface movement radar (SMR) or surface movement guidance and control systems (SMGCS) to track vehicles and aircraft on the maneuvering area such as taxiways and runways. In some examples airport ground tracking system 238 may also include cameras, movement detectors or similar items to detect wildlife or livestock that may have entered an airport. A deer or cow on a runway can be a significant hazard to aircraft. Airport ground tracking system 238 may output location information of potential hazards to data conversion unit 202 via the data communication interface. Some examples may include aircraft taxi location coordinates, ground vehicle location, and location of other hazards.

Complex, commercial turbine aircraft may include an airborne predictive wind shear system, but other aircraft, such as some turboprop aircraft may not. PWS 240 may include a low-level wind shear alert system (LLWAS) or similar systems installed at an airport to detect vertical and horizontal components of wind shear. A vertical wind shear may create turbulence while a horizontal wind shear may result in a cross wind or sudden change from headwind to tailwind. PWS 240 may output coordinate locations of geographic areas where wind shear is likely. These locations are often near thunderstorms. X-band data transmitter 20 may include these locations in the X-band data stream broadcast.

In some examples, other channels may provide similar information to that provided by X-band data transmitter 20. For example, a traffic collision avoidance system (TCAS) may provide a pilot information on the location of nearby aircraft in the form of range and bearing to the aircraft. A system including X-band data transmitter 20 in accordance with the techniques of this disclosure, such as system 200, may provide advantages for an airport, similar to airport 10 described in FIG. 1. System 200 may provide redundant information a pilot may use to cross check other sources of information. System 200 also may offload some data communication from other channels which may free those channels for other uses, or speed up the data flow.

Figure 3:
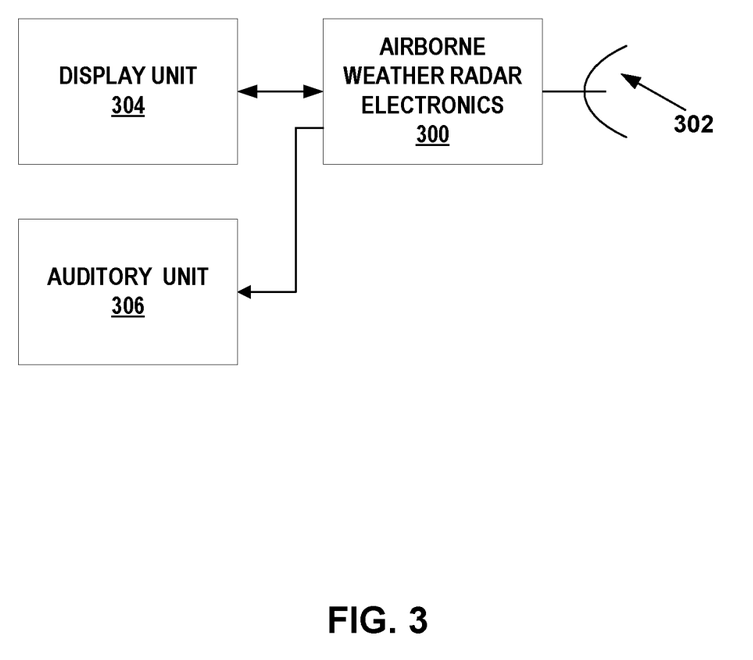
FIG. 3 is a conceptual and block diagram illustrating an example airborne weather radar system capable of receiving X-band radio data communication in accordance with one or more techniques of this disclosure.

FIG. 3 is a conceptual and block diagram illustrating an example airborne weather radar system capable of receiving X-band radio data communication in accordance with one or more techniques of this disclosure. The weather radar system of FIG. 3 is a more detailed view of weather radars, such as weather radar systems 40A and 40B described in FIG. 1. In the context of this disclosure, the term airborne in airborne weather radar system is intended to refer to a weather radar system capable of operating onboard an airplane while the airplane is airborne. It should be understood, however, that not all aspects of the weather radar functionality described in this disclosure will be performed only while an airplane is airborne. In fact, it is explicitly contemplated that certain functionality attributed to weather radar in this disclosure may be performed while an airplane is at an airport and not airborne.

The airborne weather radar system of FIG. 3 may include weather radar electronics 300, weather radar antenna 302, display unit 304 and auditory unit 306. Weather radar electronics 300 includes radar transmission circuits, radar receiver circuits, signal processing circuits and may include one or more processors and computer readable media. The computer readable media may include firmware/software that the one or more processors execute to perform functions of the weather radar system. The computer readable media may include instructions executed by the processors and other circuits to include an X-band radio capability. Weather radar electronics 300 receives the X-band data signal from weather radar antenna 302, downconverts and decodes the X-band data signal to extract the data stream and converts the data stream into an alert signal. Weather radar electronics 300 outputs the alert signal to display unit 304.

Weather radar antenna 302 may include a parabolic antenna, a slotted matrix antenna or similar antenna suitable for use with a weather radar. Weather radar antenna 302 may be mounted on a gimbaled, motorized platform capable of aiming weather radar antenna 302 as needed. In the example of a slotted array antenna, weather radar antenna 302 also include electronic beam steering. Weather radar antenna 302 may transmit and receive radar signals and can also receive the X-band radio data transmissions broadcast by X-band data transmitter 20. In one example, the airborne weather radar system may insert a few listen only pulses dedicated to decode the incoming X-band data streams from airport. In other words, the weather radar need not switch to a special data receiving mode and may still perform weather radar functions while receiving the X-band data stream. Weather radar antenna 302 sends the received X-band radio data transmissions to airborne weather radar electronics 300 for decoding and processing.

Display unit 304 is operatively coupled to airborne weather radar electronics 300. In some examples display unit 304 may be dedicated display that is integrated in the same unit as weather radar electronics 300. In other examples display unit 304 may be a NFD or other display separate from weather radar electronics 300, such as a tablet computer. Display unit 304 receives the alert signal from the display output of weather radar electronics 300 and presents a representation of the alert signal. In some examples the representation of the alert signal may include text such as "Wind 290 at 11 knots." In other examples the representation of the alert signal may include a graphical overlay on a geographic diagram that shows the location of potential wind shear hazards and bird strike hazards. Still other examples may include a combination such as the geographic position of a nearby aircraft along with text depicting the aircraft's ID and altitude Auditory unit 306 may be a stand-alone unit that may convert an alert signal and present the alert signal to the pilot as an auditory message. In other examples, auditory unit 306 may be a component of a larger system, such as a flight management system. Auditory unit 306 may deliver a representation of the alert signal as an auditory message. The alert signals sent to auditory unit 306 may include those that are in a format compatible with an auditory message. For example, airborne weather radar electronics 300 may receive and decode a datastream indicating that runway 12L has an animal obstructing the runway and output an alert signal. The alert signal may go to display unit 304 for display. Auditory unit 306 may also receive the alert signal and may present an auditory message through an auditory output, such as speakers or headphones. The auditory message in this example may be, "warning, runway 12L obstructed." In some aircraft, auditory unit 306 may present the pilot with additional information received through the X-band radio.

In the example of FIG. 3, display unit 304 may include controls for the pilot to set what information the display unit presents and to filter out information the pilot may not want to display. Controls may be in the form of knobs, dials, touchscreen or similar controls. For example, a pilot may choose not to display weather information from an airport's AWOS to avoid cluttering the screen on the display unit. The pilot may choose instead to receive the weather information over voice channel from ATIS. However, the pilot may choose to display possible wind shear area information.

Figure 4:
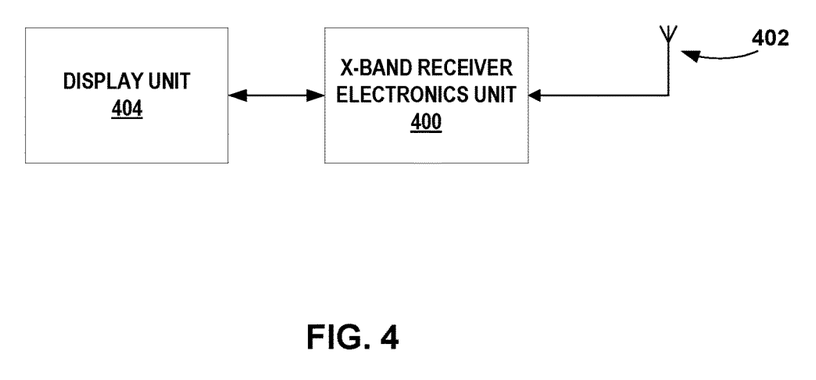
FIG. 4 is a conceptual block diagram illustrating an example airborne X-band radio receiver capable of receiving X-band radio data communication in accordance with one or more techniques of this disclosure.

FIG. 4 is a is a conceptual and block diagram illustrating an example airborne X-band radio receiver capable of receiving X-band radio data communication in accordance with one or more techniques of this disclosure. The X-band radio receiver of FIG. 4 is equivalent to the simple included in aircraft 34 as described in FIG. 1.

The example airborne X-band radio receiver of FIG. 4 may include X-band receiver electronics unit 400, omnidirectional antenna 402 and display unit 404. Example X-band receiver electronics unit 400 includes radio receiver circuits, signal processing circuits and may include one or more processors and computer readable media. The computer readable media may include firmware/software that the one or more processors execute to perform functions of the X-band radio capability. X-band receiver electronics unit 400 receives the X-band data signal from omnidirectional antenna 402, downconverts and decodes the data signal to extract the data stream and converts the data stream into an alert signal. X-band receiver electronics unit 400 outputs the alert signal to display unit 404. Though not shown in FIG. 4, X-band receiver electronics unit 400 may output the alert signal to an auditory alert system, as described above.

Omnidirectional antenna 402 may be integrated as part of the airborne X-band radio receiver, or may be mounted inside or external to an aircraft, such as aircraft 34. Omnidirectional antenna 402 conducts received X-band radio data transmitted by X-band data transmitter 20 to x-band receiver electronics unit 400 for decoding and processing.

Display unit 404 is operatively coupled to X-band receiver electronics unit 400. In some examples display unit 404 may be dedicated display integrated in the same unit as X-band receiver electronics unit 400. In other examples, display unit 404 may be a MFD or other display separate from X-band receiver electronics unit 400. Display unit 404 receives the alert signal from the display output of X-band receiver electronics unit 400 and presents a representation of the alert signal to the pilot. As described above for display unit 304 in FIG. 3, the representation of the alert signal may include text, graphics or a combination such as the geographic position of a nearby aircraft along with text depicting the aircraft's ID and altitude. As with FIG. 3 above, display unit 404 may include controls for the pilot to set what information the display unit presents and to filter out information the pilot may not want to display.

Figure 5:
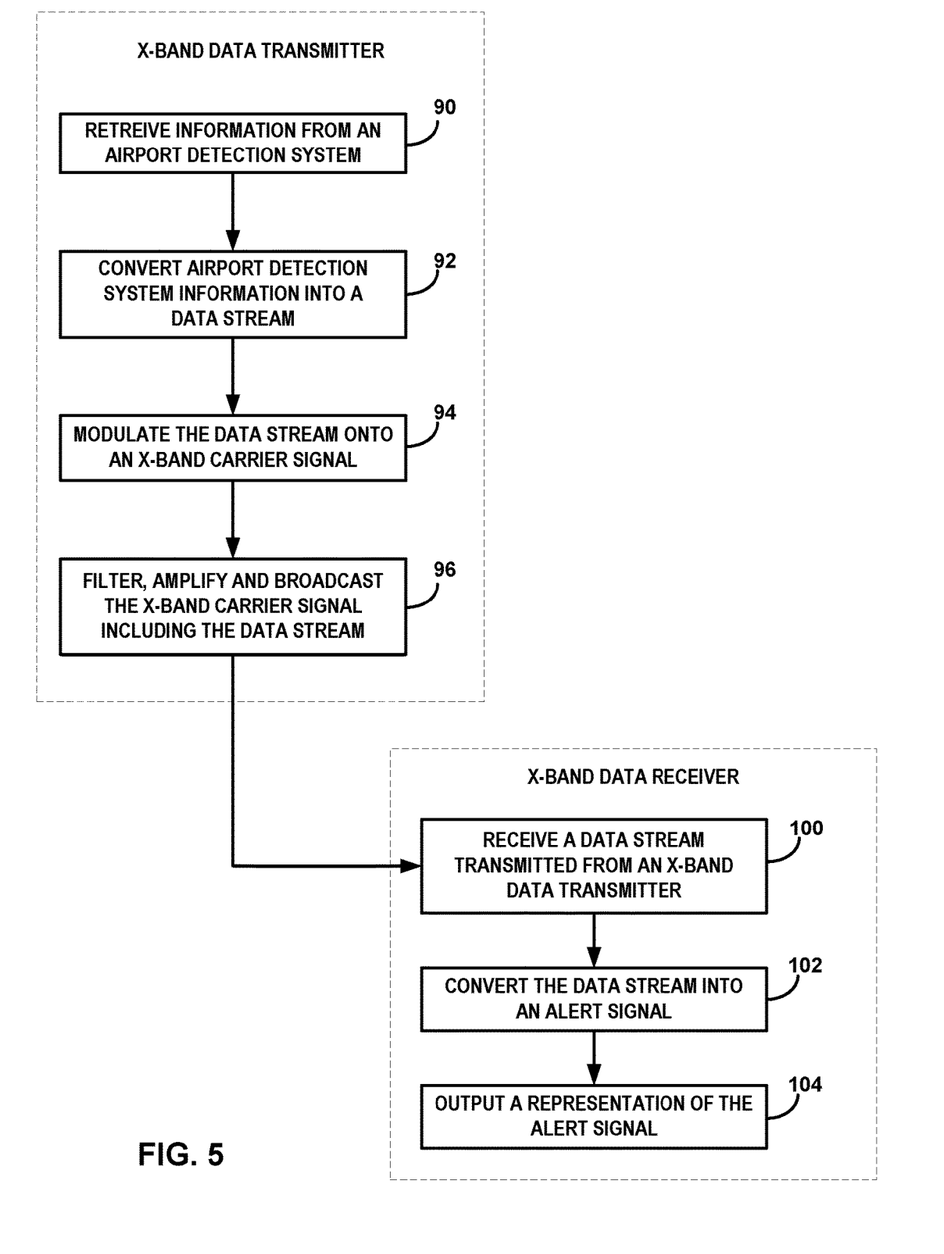
FIG. 5 is a flow chart illustrating an example mode of operation of an X-band data communication system in accordance with one or more techniques of this disclosure.

FIG. 5 is a flow chart illustrating an example mode of operation of an X-band data communication system in accordance with one or more techniques of this disclosure. The flow chart of FIG. 5 will be described in terms of FIGS. 1-4.

An X-band data transmitter, such as X-band data transmitter 20 shown in FIGS. 1-2 may retrieve information from one or more airport detection systems (90). Airport detection systems may include ATC radar 236, avian detection system 234 or some other detection system. The X-band data transmitter may receive this information via a wired, wireless or some other form of data communication system that connects the airport detection systems to the X-band data transmitter.

X-band data transmitter may convert the information from the airport detection system into a data stream (92) that is compatible with the software/firmware data decoder loaded in a weather radar onboard an aircraft, as described above in FIG. 1. Each airport detection system may output its data in a format particular to the detection system, such as Network Common Data Format (NetCDF), which may be converted so the data decoder within the weather radar system can properly interpret the data stream.

In the example of FIG. 2, X-band data upconverter 204 modulates the data stream onto a baseband carrier signal, then up-convert the baseband carrier through one or more stages of carrier multiplication and associated filtering until the modulated carrier signal reaches X-band frequency (94). The X-band modulated carrier, also referred to as X-band data, goes to low power X-band transmitter 206.

Low power X-band transmitter 206 filters, amplifies and transmits the X-band carrier signal to omnidirectional antenna 22 for further broadcast (96) to aircraft in the vicinity of the airport, as described above in FIG. 1. The X-band carrier signal includes the data stream with information from the one or more airport detection systems. As discussed above, the functional blocks depicted in the example of FIG. 2 are just one possible arrangement of the functions of X-band data transmitter 20. Other examples of X-band data transmitter 20 may include more, fewer or a different arrangement of functional blocks.

Once broadcast, an aircraft such as aircraft 30 may receive the data stream transmitted from X-band data transmitter 20 (100). Any aircraft within receiving distance of X-band data transmitter 20 would be able to receive the data stream. In other words, an aircraft within approximately ten nautical miles of X-band data transmitter 20 may take advantage of the techniques of this disclosure. An aircraft with an X-band weather radar modified according to the techniques of this disclosure may downconvert the X-band carrier signal that includes the data stream and decode the data stream to extract the information from the airport detection systems. Unlike more complex communication systems that may include scheduling units for data fusion, a weather radar that also functions as an X-band radio receiver may include firmware/software to provide the X-band radio receiver functionality. Similarly, an aircraft without a weather radar, such as aircraft 34, may include a simple X-band radio receiver unit that may also downconvert and decode the X-band carrier signal. Receiving information from airport detection systems via X-band radio receiver may free up bandwidth for the more complex data fusion communication systems to operate faster and more efficiently.

The X-band radio function of a weather radar converts the extracted information from the airport detection system into an alert signal (102). As the X-band radio receiver function uses the existing weather radar hardware, the alert signal remains compatible with the existing display unit. In some examples the display unit is integrated as part of the weather radar. In other examples, the weather radar may output the alert signal to an MFD or other display device. As described above, an X-band radio receiver on an aircraft without a weather radar may also have an integrated display unit or output the alert signal to an MFD, tablet computer or other display device as well, in some examples, deliver an auditory message.

The aircraft display unit shows a representation of the alert signal (104). As discussed above, the representation may be text, graphical or some combination of text and graphics. A pilot may select which information to show on the display unit by manipulating controls either on the display unit, or some other location, as described above. A pilot may choose to display information from airport detection systems to improve the pilot's situational awareness. In some examples a pilot may choose to duplicate information already provided by systems on board the aircraft as a cross-check and correlation. For example, an aircraft with a PWS system may still choose to display information from a ground based PWS, such as PWS 240. Showing PWS information from both systems may give the pilot confidence to keep the aircraft away from any potential wind shear hazards. In other examples a pilot may choose to display information not available on board the aircraft. For example, a ground based avian detection system, such as avian detection system 234, may provide information on potential bird strike danger. Receiving bird strike danger information via an X-band radio receiver may have the advantage of making more bandwidth available on voice communication channels or other data link channels.

In one or more examples, the functions described by this disclosure may be implemented in hardware, software, firmware, or any combination thereof. For example, the various components of FIGS. 2-4, such as airborne weather radar electronics 300, X-band receiver electronics unit 400 and data conversion unit 202, may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

The term X-band, as used in this disclosure, generally refers to a segment of the microwave radio region of the electromagnetic spectrum that may be used for radar, including weather radar. In radar technology, the frequency range of X-band is specified by the Institute of Electrical and Electronics Engineers (IEEE) to be 8.0 to 12.0 GHz. X-band weather radar may, for example, have a wavelength of 2.5 to 4 centimeters.

By way of example, and not limitation, such computer-readable storage media, which may be included in airborne weather radar electronics 300, X-band receiver electronics unit 400 or X-band data transmitter 20, can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples of the disclosure have been described. These and other examples are within the scope of the following claims.

The invention claimed is:

1. A method comprising:

transmitting, by a weather radar antenna of a weather radar system of an aircraft, radar signals;

receiving, by the weather radar antenna of the weather radar system, reflected radar signals;

receiving, by the weather radar antenna of the weather radar system, an X-band carrier signal, wherein the X-band carrier signal comprises a broadcast signal from an omni-directional X-band transmitting antenna and includes a digital data stream, wherein the digital data stream is separate from the reflected radar signals;

converting, by the weather radar system, the digital data stream into an alert signal; and outputting, to an operator of the aircraft and by the weather radar system, a representation of the alert signal.

2. The method of claim 1, wherein the digital data stream includes first information and second information, and the first information and the second information comprise one or more of lightning location, runway wind speed, runway wind direction, precipitation, visibility, temperature, air pressure, airborne aircraft location coordinates, aircraft taxi location coordinates, bird flock location coordinates, wind shear area coordinates, or ground vehicle location coordinates.

3. The method of claim 1, further comprising:

performing, by the weather radar system, weather radar functions while receiving the digital data stream.

4. The method of claim 1, wherein outputting, by the weather radar system, the representation of the alert signal comprises outputting the alert signal to a multi-function display (MFD).

5. The method of claim 1, further comprising:
outputting the representation of the alert signal as an auditory message.

6. The method of claim 1, wherein the weather radar system receives the digital data stream from an airport X-band data transmitter.

7. The method of claim 1, wherein outputting, by the weather radar system, the representation of the alert signal comprises outputting the alert signal to an integrated display unit of the weather radar system.

8. A system for data communication, the system comprising:
a data communication interface configured to receive first information from a first airport detection system;
an X-band data conversion unit communicatively coupled to the data communication interface and configured to convert the first information from the first airport detection system to first digital data on an X-band carrier signal, wherein to convert the first information, the X-band data conversion unit modulates the X-band carrier signal to load the first digital data onto the X-band carrier signal;
an omnidirectional antenna; and
an X-band data transmitter configured to receive the first digital data from the X-band data converter and transmit broadcast the first digital data on the X-band carrier signal via the omnidirectional antenna.

9. The system of claim 8, wherein the X-band data conversion unit is further configured to convert second information from a second airport detection system to second digital data on the X-band carrier signal.

10. The system of claim 9, wherein the first airport detection system and the second airport detection system comprise one or more of: air traffic control (ATC) radar, airport surveillance radar (ASR), terminal Doppler weather radar (TDWR), airport surface detection system, avian radar system, predictive wind shear system (PWS), Automated Weather Observing System (AWOS) or bird strike prevention system.

11. The system of claim 9, wherein the first information and the second information comprise one or more of lightning location, runway wind speed, runway wind direction, precipitation, visibility, temperature, air pressure, airborne aircraft location coordinates, aircraft taxi location coordinates, bird flock location coordinates, wind shear area coordinates, or ground vehicle location coordinates.

12. The system of claim 8, wherein the omnidirectional antenna is on an airport and the X-band data transmitter is configured to transmit the first digital data from the airport to an aircraft within receiving distance of the X-band data transmitter.

13. The system of claim 12, wherein the receiving distance of the X-band data transmitter is approximately ten nautical miles.

14. A device installed in an aircraft comprising:
an X-band transmitting antenna configured to transmit radar signals;
an X-band receiving antenna configured to receive reflected radar signals and an X-band carrier signal, wherein:
the X-band carrier signal comprises a broadcast signal from an omni-directional X-band transmitting antenna;
the X-band carrier signal includes a digital data stream, and
the X-band carrier signal is separate from the reflected radar signals;
X-band data receiver circuitry configured to extract a digital data stream from the X-band digital data signal and convert the digital data stream into an alert signal; and
an output device configured to output the alert signal to an operator of the aircraft.

15. The device of claim 14, further comprising:
an integrated display unit, wherein the integrated display unit is configured to receive the alert signal at the output device and present a representation of the alert signal.

16. The device of claim 14, wherein:
the alert signal is compatible with a multi-function display (MFD),
the MFD is configured to receive the alert signal at the output device, and
the alert signal causes the MFD to present a representation of the alert signal.

17. The device of claim 14, wherein the output device is configured to output the alert signal in a format compatible with an auditory message.

18. The device of claim 14, wherein the X-band receiving antenna is an airborne weather radar antenna and the X-band data receiver circuitry includes computer-readable medium storing instructions that provide the capability for the X-band receiver circuitry to extract the digital data stream from the X-band data signal.

19. The device of claim 14, wherein the X-band receiving antenna comprises an omnidirectional X-band receiving antenna.

20. The device of claim 14, wherein the digital data stream includes first information and second information and the first information and the second information comprise one or more of lightning location, runway wind speed, runway wind direction, precipitation, visibility, temperature, air pressure, airborne aircraft location coordinates, aircraft taxi location coordinates, bird flock location coordinates, wind shear area coordinates, or ground vehicle location coordinates.

* * * * *